United States Patent [19]
Nishimoto et al.

[11] Patent Number: 5,752,209
[45] Date of Patent: May 12, 1998

[54] ELECTRIC POWER STEERING APPARATUS

[75] Inventors: Mitsuhiko Nishimoto, Kashihara; Makoto Inoue, Hirakata, both of Japan

[73] Assignees: Koyo Seiko Co., Ltd.; Matsushita Electric Industrial Co., Ltd., both of Osaka, Japan

[21] Appl. No.: 544,621

[22] Filed: Oct. 18, 1995

[30] Foreign Application Priority Data

Oct. 20, 1994 [JP] Japan .................................. 6-255595

[51] Int. Cl.⁶ .................................................... G06F 7/70
[52] U.S. Cl. .................... 701/41; 701/42; 701/43; 180/446; 318/434
[58] Field of Search ........................ 364/424.051, 424.052, 364/424.053; 180/446, 404, 412, 443; 318/293, 434, 696, 286, 466, 432; 701/41, 42, 43; 388/831, 829, 915

[56] References Cited

U.S. PATENT DOCUMENTS

| | | | |
|---|---|---|---|
| 4,691,797 | 9/1987 | Miller | 180/143 |
| 4,756,375 | 7/1988 | Ishikura et al. | 180/79.1 |
| 4,809,173 | 2/1989 | Fukami et al. | 364/424.05 |
| 4,940,107 | 7/1990 | Hanisko | 180/142 |
| 4,961,474 | 10/1990 | Daido et al. | 180/446 |
| 4,977,507 | 12/1990 | Mastsuoka et al. | 364/424.053 |
| 5,000,278 | 3/1991 | Morishita | 180/446 |
| 5,039,926 | 8/1991 | Morishita et al. | 318/434 |
| 5,076,381 | 12/1991 | Daido et al. | 180/446 |
| 5,097,918 | 3/1992 | Daido et al. | 180/446 |
| 5,201,818 | 4/1993 | Nishimoto | 364/424.051 |
| 5,259,473 | 11/1993 | Nishimoto | 364/424.053 |
| 5,271,474 | 12/1993 | Nishimoto et al. | 364/424.053 |
| 5,355,315 | 10/1994 | Daido et al. | 364/424.051 |
| 5,444,622 | 8/1995 | Takeshima et al. | 364/424.051 |
| 5,480,000 | 1/1996 | Daido et al. | 364/424.052 |
| 5,485,067 | 1/1996 | Nishimoto et al. | 318/466 |
| 5,563,790 | 10/1996 | Wada et al. | 364/424.051 |
| 5,568,389 | 10/1996 | McLaughlin et al. | 364/424.051 |
| 5,569,991 | 10/1996 | Matsuoka et al. | 318/286 |
| 5,602,735 | 2/1997 | Wada | 364/424.051 |

FOREIGN PATENT DOCUMENTS

| | | |
|---|---|---|
| 0361726 | 4/1990 | European Pat. Off. . |
| 0421766 | 4/1991 | European Pat. Off. . |
| 0556869 | 8/1993 | European Pat. Off. . |
| 0611691 | 8/1994 | European Pat. Off. . |
| 04019270 | 1/1992 | Japan . |
| 04300780 | 10/1992 | Japan . |

*Primary Examiner*—Jacques H. Louis-Jacques
*Attorney, Agent, or Firm*—Helfgott & Karas, P.C.

[57] ABSTRACT

The invention provides an electric power steering apparatus in which a duty ratio upper limit value is obtained on the basis of a vehicle speed of a vehicle and a supply voltage for a motor and a target duty ratio is determined as a value not exceeding the duty ratio upper limit value, so as to prevent an excessive steering assisting force from being caused by the malfunction of a driving current detecting circuit for the motor.

10 Claims, 11 Drawing Sheets

ELECTRIC POWER STEERING APPARATUS

BACKGROUND OF THE INVENTION

1. Field of the Invention

The present invention relates generally to an electric power steering apparatus, and more particularly to an electric power steering apparatus for driving a steering power assisting motor under PWM (pulse width modulation) by using a motor driving current as a feedback for the PWM automatic control wherein the motor driving current is determined on the basis of a steering torque and is considered as a target current for use as a reference value for the automatic control.

2. Description of Related Art

In an electric power steering apparatus for driving a steering power assisting motor under PWM control by using a target current value for the steering power assisting motor determined on the basis of steering torque and a driving current for the steering power assisting motor, a difference between the target current value for the steering power assisting motor and a detected value of the driving current becomes excessively larger than an actual value when a circuit for detecting the driving current for the steering power assisting motor has some trouble in detecting a current values. A driving voltage applied to the steering power assisting motor is increased to minimize the difference, resulting in an excessive driving current and an excessive steering assisting force. As a result, a steering wheel is moved dangerously lightly.

As a countermeasure, a conventional power steering apparatus is provided with a fail-safe system. For example, when the absolute value of a target current value for the steering power assisting motor exceeds a predetermined value and the absolute value of a detected value of the driving current is extremely small, a clutch in a transfer mechanism between the steering wheel and the electric power steering apparatus is turned off.

However, the conditions that a target current value for the steering power assisting motor exceeds a predetermined value and that a detected value of the driving current is extremely small can be satisfied also when the driving current is offset by a current caused by a counter electromotive force. The counter electromotive force is generated as a result of increase of the number of rotations of the steering power assisting motor due to abrupt steering, and is not caused by the failure of the circuit in the case. In order to distinguish such a case from the malfunction of the circuit, the fail-safe system is actuated only when the conditions that a target current value for the steering power assisting motor exceeds a predetermined value and that a detected value of the driving current is extremely small are satisfied over a predetermined period of time (for example, 0.5 sec.). This leads to delay response, and hence, this system is insufficient for safety particularly in high speed driving.

SUMMARY OF THE INVENTION

The present invention has been devised to overcome the aforementioned problems, and the object thereof is to provide an electric power steering apparatus having improved safety in which an excessive steering assisting force during the malfunction of a circuit for detecting a driving current for a steering power assisting motor can be prevented.

The electric power steering apparatus of the invention comprises upper-limit decision means for determining a duty ratio upper limit value for PWM control from a vehicle speed and a power source voltage of the aforementioned motor; target current value decision means for determining a target current value for the motor on the basis of steering torque; and duty ratio decision means for obtaining a target duty ratio corresponding to the target current value determined by the target current value decision means so as to determine a duty ratio of a PWM wave signal used for driving the motor as a value not exceeding the duty ratio upper limit value.

Therefore, since the target duty ratio generally exceeds the duty ratio upper limit value when the circuit for detecting the driving current for the steering power assisting motor is out of order, the target duty ratio is determined as a value not exceeding the duty ratio upper limit value. Thus, an excessive current is prevented from flowing into the motor. When the circuit is normally operated, the target duty ratio is used for driving the motor. A duty ratio upper limit value is set as a value that is generally unnecessary, i.e., a value larger than a normal target duty ratio by a predetermined amount, and hence, a target duty ratio never exceeds a duty ratio upper limit value.

In one aspect of the invention, the electric power steering apparatus of the invention further comprises torque condition judgement means for comparing the steering torque with a predetermined torque value and supplying the duty ratio upper limit value determined by the upper-limit decision means to the duty ratio decision means when the steering torque is smaller than the predetermined torque value.

Therefore, the torque condition judgement means makes it possible to distinguish the malfunction of the driving current detecting circuit from the case where a detected value of the driving current is decreased because of a smaller motor current caused by increase of a counter electromotive force resulting from increase of the number of rotations of the steering power assisting motor due to abrupt steering.

In another aspect of the invention, the electric power steering apparatus of the invention further comprises steering speed detecting means for detecting a steering speed, and steering speed condition judgement means for comparing the steering speed detected by the steering speed detecting means with a predetermined speed value and supplying the duty ratio upper limit value determined by the upper-limit decision means to the duty ratio decision means when the steering speed is smaller than the predetermined speed value.

Therefore, the steering speed condition judgement means makes it possible to distinguish the malfunction of the driving current detecting circuit from the case where a detected value of the driving current is decreased because of a smaller motor current caused by increase of a counter electromotive force resulting from increase of the number of rotations of the steering power assisting motor due to abrupt steering.

Alternatively, the electric power steering apparatus of the invention comprises upper-limit decision means for determining a duty ratio upper limit value for PWM control on the basis of a vehicle speed; steering speed detecting means for detecting a steering speed; coefficient decision means for determining a coefficient on the basis of the steering speed detected by the steering speed detecting means and a supply voltage for the motor; corrected upper-limit calculation means for calculating a corrected duty ratio upper limit value on the basis of the duty ratio upper limit value determined by the upper-limit decision means and the coefficient determined by the coefficient decision means; target current value decision means for determining a target current value for the motor on the basis of steering torque; and duty ratio decision means for obtaining a target duty ratio corresponding to the target current value determined by the target current value decision means so as to determine a duty ratio of a PWM wave signal used for driving the motor as a value not exceeding the corrected duty ratio upper limit value.

Therefore, since the target duty ratio generally exceeds the duty ratio upper limit value when the circuit for detecting the driving current for the steering power assisting motor is out of order, the target duty ratio is determined as a value not exceeding the duty ratio upper limit value. Thus, an excessive current is prevented from flowing into the motor. At this point, since the duty ratio upper limit value is corrected to be smaller as the steering speed is decreased, the apparatus is free from an effect of a counter electromotive force. When the circuit is normally operated, the target duty ratio at that time is used for driving the motor. A duty ratio upper limit value is set as a value that is generally unnecessary, i.e., a value larger than a normal target duty ratio by a predetermined amount, and hence, a target duty ratio never exceeds a duty ratio upper limit value.

The above and further objects and features of the invention will more fully be apparent from the following detailed description with accompanying drawings.

DETAILED DESCRIPTION OF THE INVENTION

The present invention will now be described in detail referring to the accompanying drawings illustrating the embodiments thereof.

Embodiment 1

Figure 1:
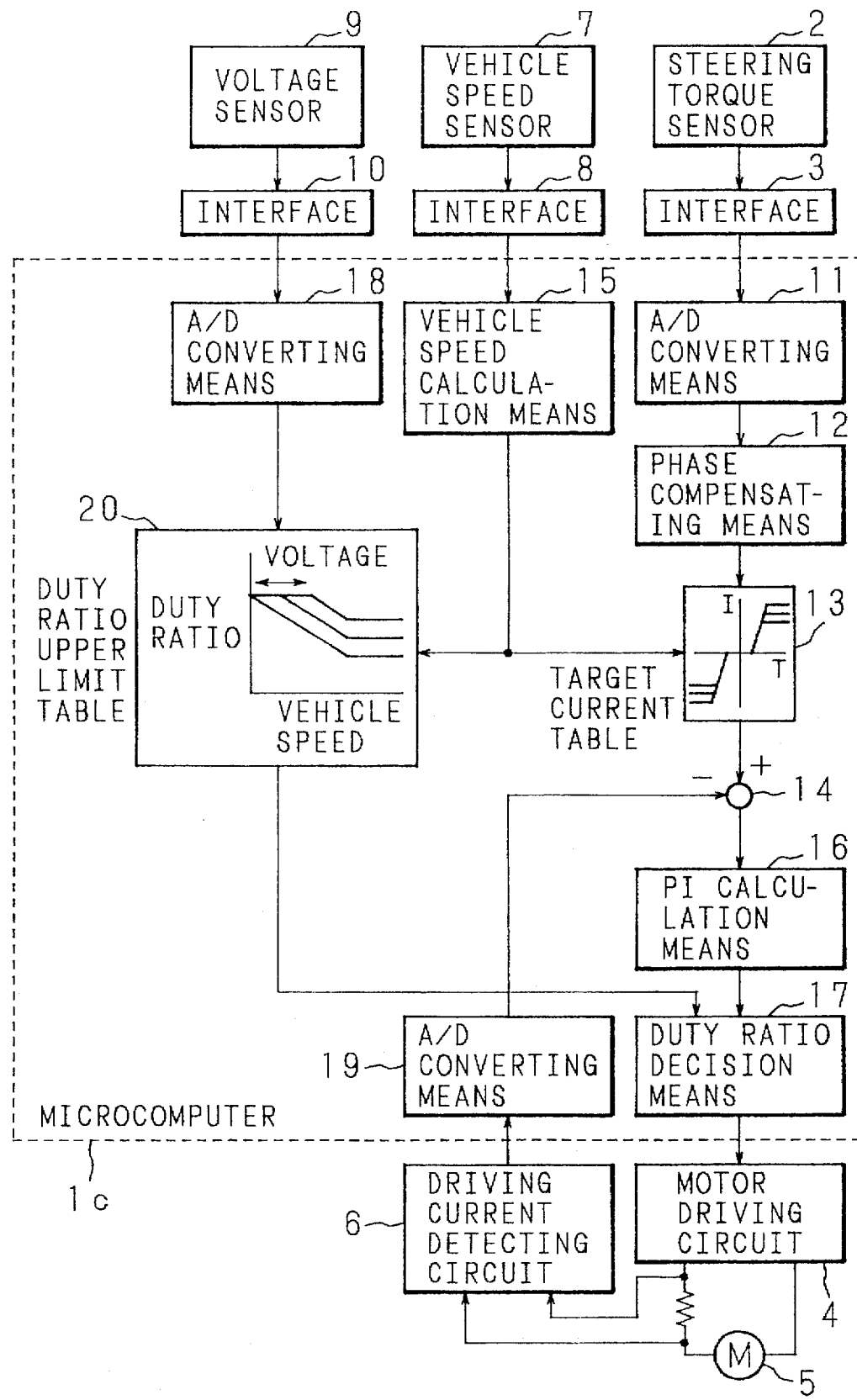
FIG. 1 is a block diagram showing a schematic configuration of an electric power steering apparatus of Embodiment 1 of the invention.

FIG. 1 is a block diagram showing a schematic configuration of an electric power steering apparatus of Embodiment 1. In this electric power steering apparatus, a steering torque signal from a steering torque sensor 2 provided on a steering shaft (not shown) is supplied to a microcomputer 1 via an interface 3 and A/D converted by A/D converting means 11 in the microcomputer 1, and the converted signal is phase compensated by phase compensating means 12.

The output from a vehicle speed sensor 7 is supplied to the microcomputer 1 via an interface 8 and arithmetically processed into a speed signal by speed calculation means 15. The microcomputer 1 stores, in its memory, the relationship among steering torque, a vehicle speed and a target current value for a steering power assisting motor 5 as a target current table 13, and reads and outputs a target current based on the steering torque supplied from the phase compensating means 12 and the vehicle speed supplied from the vehicle speed sensor 7.

A driving current for the motor 5 is detected by a driving current detecting circuit 6, and the detected current is A/D converted by A/D converting means 19 to be fed back to subtracting means 14. The subtracting means 14 obtains a difference between the target current and the feed-back value of the driving current for the motor 5, and the difference is supplied to PI calculation means 16. The PI calculation means 16 adds the difference (a proportional element) and the integrated value of the difference (an integrated element) to a previous control amount to obtain a control amount at this time.

The output of a voltage sensor 9 for detecting a supply voltage for the motor 5 is supplied to the microcomputer 1 via an interface 10 and A/D converted by A/D converting means 18. The microcomputer 1 stores, in its memory, the relationship among a supply voltage, a vehicle speed supplied from the vehicle speed sensor 7 and a duty ratio upper limit value for the PWM control as a duty ratio upper limit table 20, reads a duty ratio upper limit value determined on the basis of the vehicle speed supplied from the vehicle speed sensor 7 and the supply voltage supplied from the voltage sensor 9, and outputs the duty ratio upper limit value to duty ratio decision means 17.

Figure 2:
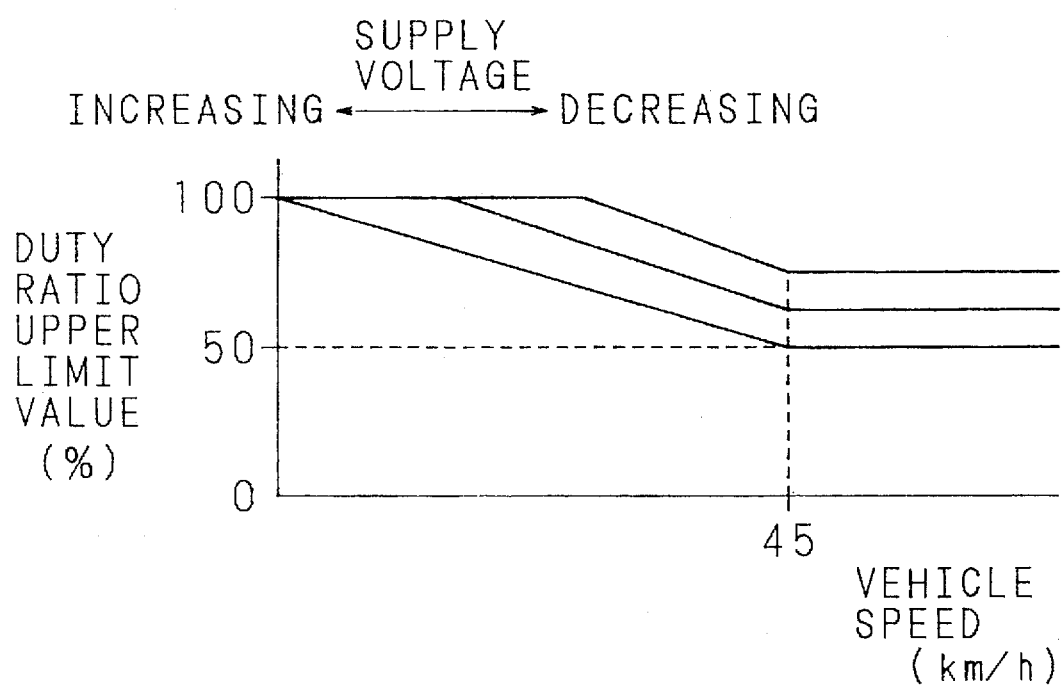
FIG. 2 is a graph showing a relationship among a supply voltage, a vehicle speed and a duty ratio upper limit value for PWM control in the electric power steering apparatus of the invention.

The relationship among a supply voltage, a vehicle speed supplied from the vehicle speed sensor 7 and a duty ratio upper limit value for the PWM control is shown in FIG. 2. As is apparent from the graph of FIG. 2, a duty ratio upper limit value becomes smaller as a supply voltage is increased and as a vehicle speed is increased. For example, when a vehicle speed is over 45 km/h., a duty ratio upper limit value becomes constant (for example, 50%), resulting in a minimum or zero driving current.

A PWM wave signal whose duty ratio for the PWM control is decided by the duty ratio decision means 17 is supplied to a motor driving circuit 4 comprising an H-type bridge of four switching transistors.

Figure 3:
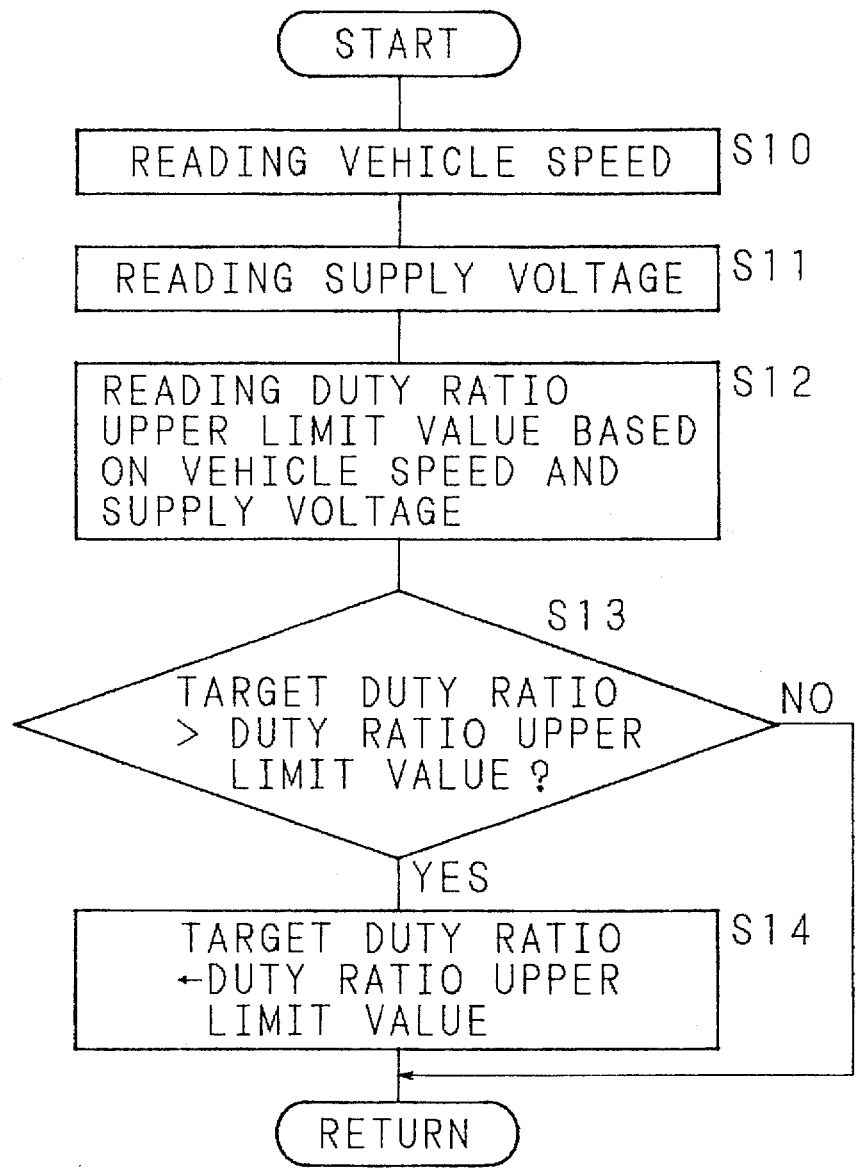
FIG. 3 is a flowchart for the operation for deciding a duty ratio for the PWM control in Embodiment 1.

The operation for deciding a duty ratio for the PWM control in Embodiment 1 will now be described referring to the flowchart of FIG. 3.

The microcomputer 1 reads and outputs from the target current table 13 a target current value based on the steering torque supplied from the phase compensating means 12 and the vehicle speed supplied from the vehicle speed sensor 7. The subtracting means 14 obtains a difference between the target current value and the feed-back value of the driving current for the motor 5, and the PI calculation means 16 adds the difference (a proportional element) and the integrated value of the difference (an integrated element) to a previous control amount to obtain a control amount at this time. The obtained control amount is supplied to the duty ratio decision means 17 so as to decide a target duty ratio for the PWM control.

The microcomputer 1 reads the vehicle speed supplied from the vehicle speed sensor 7 and the supply voltage detected by the voltage sensor 9 (steps S10 and S11), reads a duty ratio upper limit value for the PWM control based on the supply voltage and the vehicle speed from the duty ratio upper limit table 20 (step S12), and outputs the read duty ratio upper limit value to the duty ratio decision means 17.

The duty ratio decision means 17 compares the target duty ratio with the duty ratio upper limit value (step S13), and decides to use not the target duty ratio but the duty ratio upper limit value when the target duty ratio is larger than the duty ratio upper limit value (i.e., the target duty ratio is suppressed to be the duty ratio upper limit value at most) (step S14). A PWM wave signal of the obtained target duty ratio is supplied to the motor driving circuit 4.

When the target duty ratio is smaller than the duty ratio upper limit value, the duty ratio decision means 17 decides to use the target duty ratio, and a PWM wave signal of the target duty ratio is supplied to the motor driving circuit 4.

In this manner, the maximum possible duty ratio for the PWM control becomes smaller as a vehicle speed is increased and as a supply voltage for the motor 5 is increased. Thus, an excessive steering assisting force caused in the malfunction of the driving current detecting circuit 6 can be prevented.

Embodiment 2

Figure 4:
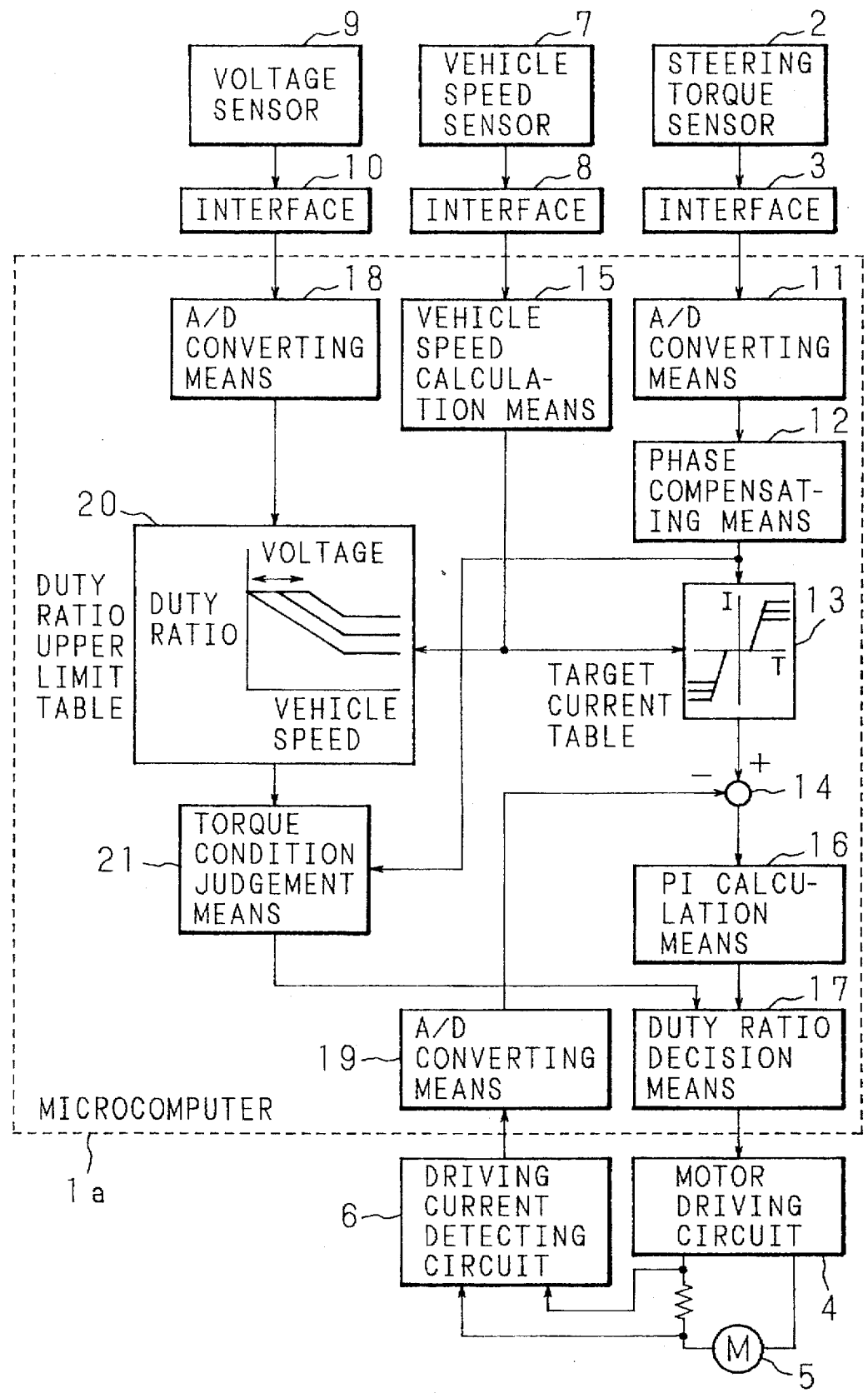
FIG. 4 is a block diagram showing a schematic configuration of an electric power steering apparatus according to Embodiment 2 of the invention.

FIG. 4 is a block diagram showing a schematic configuration of an electric power steering apparatus of Embodiment 2. This electric power steering apparatus comprises a microcomputer 1a which is similar to the microcomputer 1 of Embodiment 1 except that torque condition judgement means 21 is additionally provided. The torque condition judgement means 21 is supplied with a steering torque value whose phase has been compensated by phase compensating means 12. When the steering torque value is smaller than a predetermined steering torque value (for example, 20 kgf.cm), the torque condition judgement means 21 transfers a duty ratio upper limit value read from a duty ratio upper limit table 20 to duty ratio decision means 17. The remaining configuration is same as that of the electric power steering apparatus of Embodiment 1, and hence the description is omitted.

Figure 5:
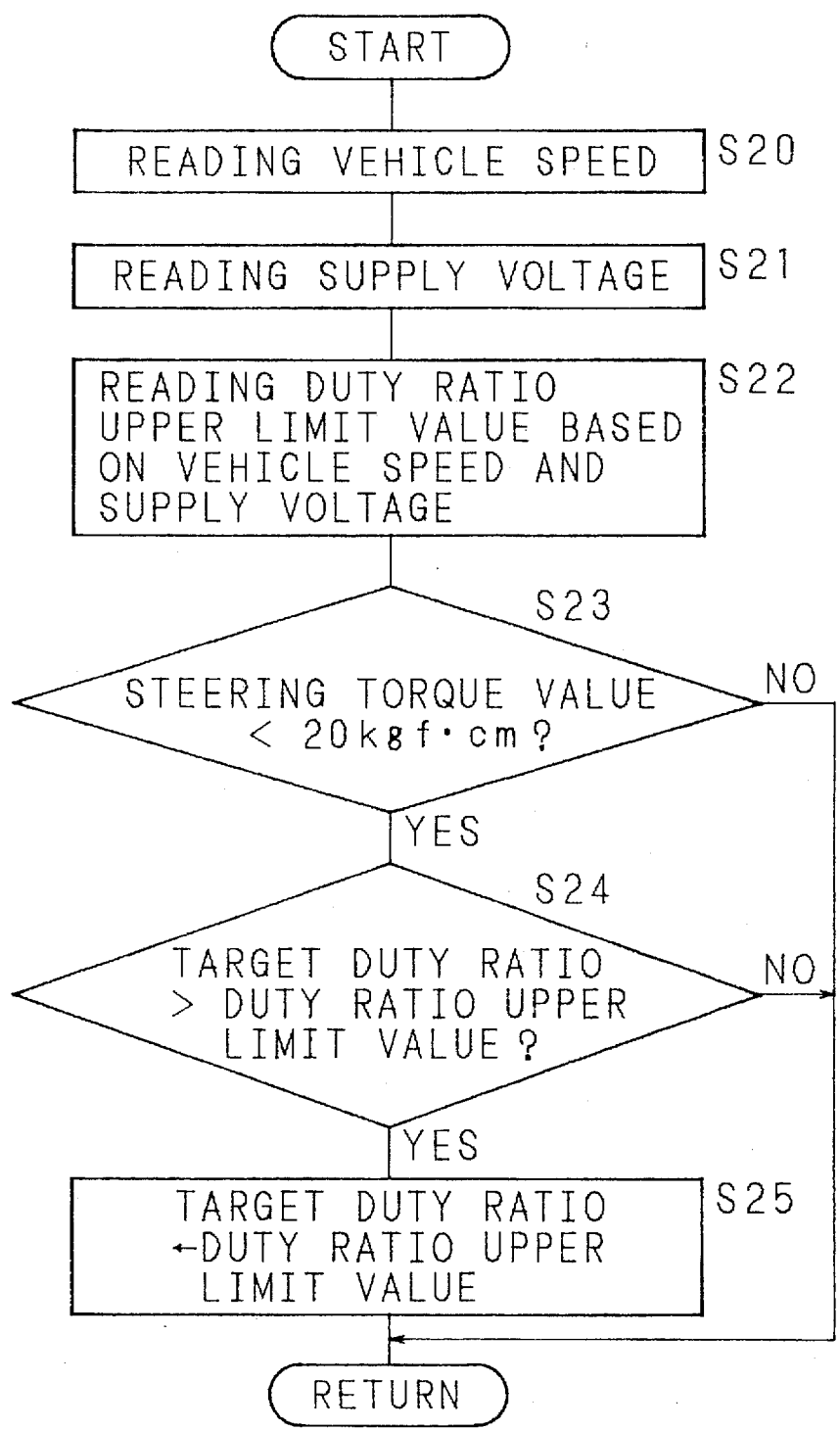
FIG. 5 is a flowchart for the operation for deciding a duty ratio for the PWM control in Embodiment 2.

The operation for deciding a duty ratio for the PWM control in Embodiment 2 will now be described referring to the flowchart shown in FIG. 5.

The microcomputer 1a reads a vehicle speed supplied from the vehicle speed sensor 7 and a supply voltage detected by the voltage sensor 9 (steps S20 and S21), and reads a duty ratio upper limit value for the PWM control based on the supply voltage and the vehicle speed from the duty ratio upper limit table 20 (step S22).

The torque condition decision means 21 is supplied with a steering torque value whose phase has been compensated by the phase compensating means 12, and compares the steering torque value with a predetermined steering torque value (for example, 20 kgf.cm) (step S23). When the steering torque value exceeds the predetermined steering torque value, the torque condition judgement means 21 does not transfer the duty ratio upper limit value read from the duty ratio upper limit table 20 to the duty ratio decision means 17. As a result, the duty ratio decision means 17 decides to use a target duty ratio determined on the basis of a control amount supplied from the PI calculation means 16, and a PWM wave signal of the target duty ratio is supplied to the motor driving circuit 4.

When the steering torque value supplied from the phase compensating means 12 is smaller than the predetermined steering torque value, the torque condition judgement means 21 transfers the duty ratio upper limit value read from the duty ratio upper limit table 20 to the duty ratio decision means 17.

The duty ratio decision means 17 compares the target duty ratio with the duty ratio upper limit value (step S24), and decides to use not the target duty ratio but the duty ratio upper limit value when the target duty ratio exceeds the duty ratio upper limit value (i.e., the target duty ratio is suppressed to be the duty ratio upper limit value at most) (step S25).

When the target duty ratio is smaller than the duty ratio upper limit value, the duty ratio decision means 17 decides to use the target duty ratio, and a PWM wave signal of the target duty ratio is supplied to the motor driving circuit 4. The remaining operation is performed in the same manner as described with regard to the electric power steering apparatus of Embodiment 1, and hence the description is omitted.

In this manner, it is possible to distinguish the malfunction of the driving current detecting circuit 6 from the case where a current value detected by the driving current detecting circuit 6 is decreased because of a smaller motor current caused by increase of a counter electromotive force resulting from increase of the number of rotations of the motor 5 due to abrupt steering (in this case the circuit is normally operated and the steering torque is comparatively large). In addition, an excessive steering assisting force caused in the malfunction of the driving current detecting circuit 6 is prevented because the maximum possible duty ratio for the PWM control becomes smaller as a vehicle speed is increased.

Embodiment 3

Figure 6:
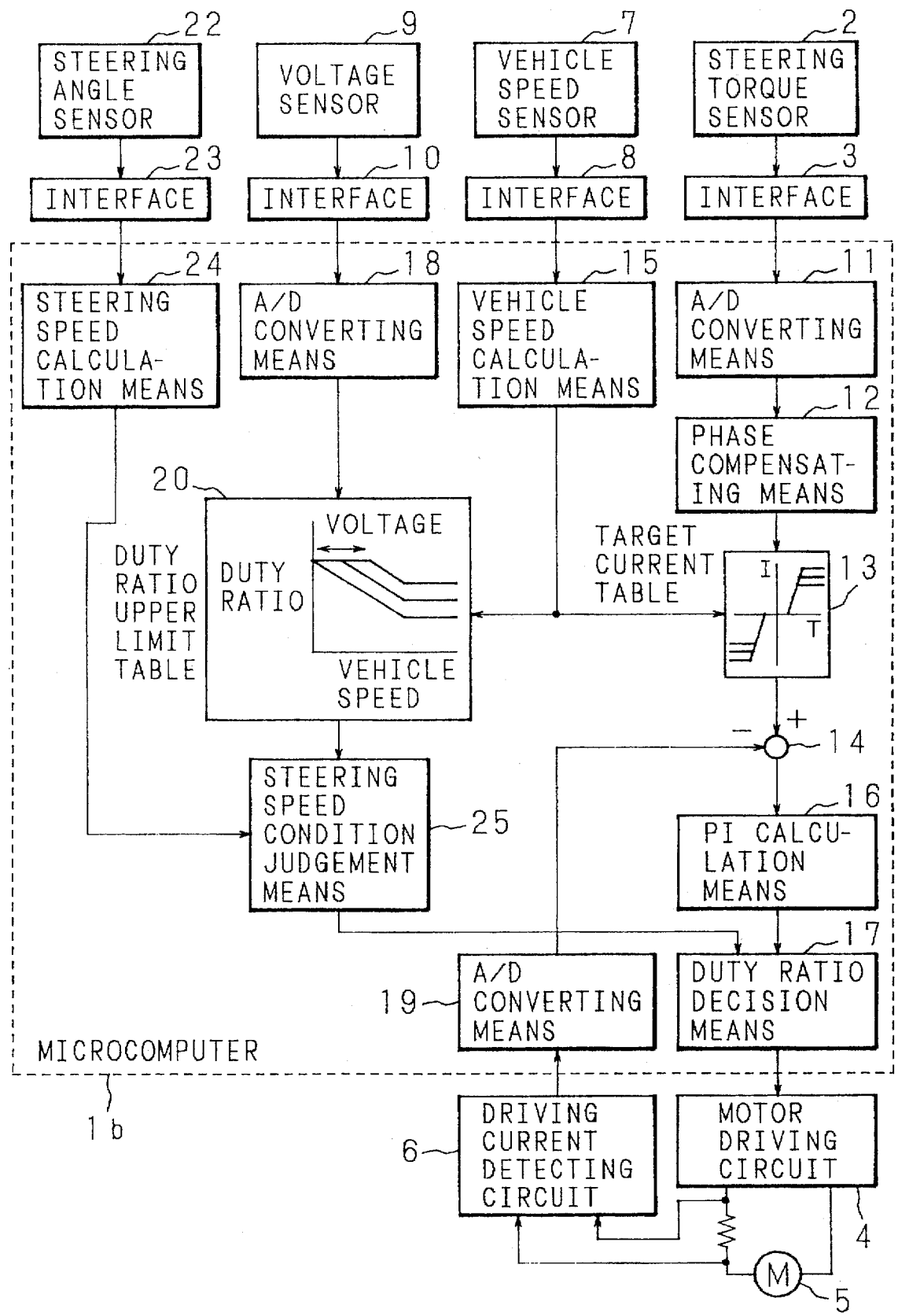
FIG. 6 is a block diagram showing a schematic configuration of an electric power steering apparatus of Embodiment 3 of the invention.

FIG. 6 is a block diagram showing a schematic configuration of an electric power steering apparatus of Embodiment 3. This electric power steering apparatus has the same configuration as the electric power steering apparatus of Embodiment 1 shown in FIG. 1 except that a steering angle sensor 22 for detecting a steering angle and an interface 23 for the steering angle sensor 22 are further provided, and that a microcomputer 1b therein additionally comprises steering speed calculation means 24 and steering speed condition judgement means 25. The steering speed calculation means 24 calculates a steering speed on the basis of a steering angle detected by the steering angle sensor 22. The steering speed condition judgement means 25 transfers a duty ratio upper limit value read from a duty ratio upper limit table 20 to duty ratio decision means 17 when the steering speed calculated by the steering speed calculation means 24 is smaller than a predetermined steering speed (for example, 300 deg./sec.). The remaining configuration is same as that described in Embodiment 1 and hence the description is omitted.

Figure 7:
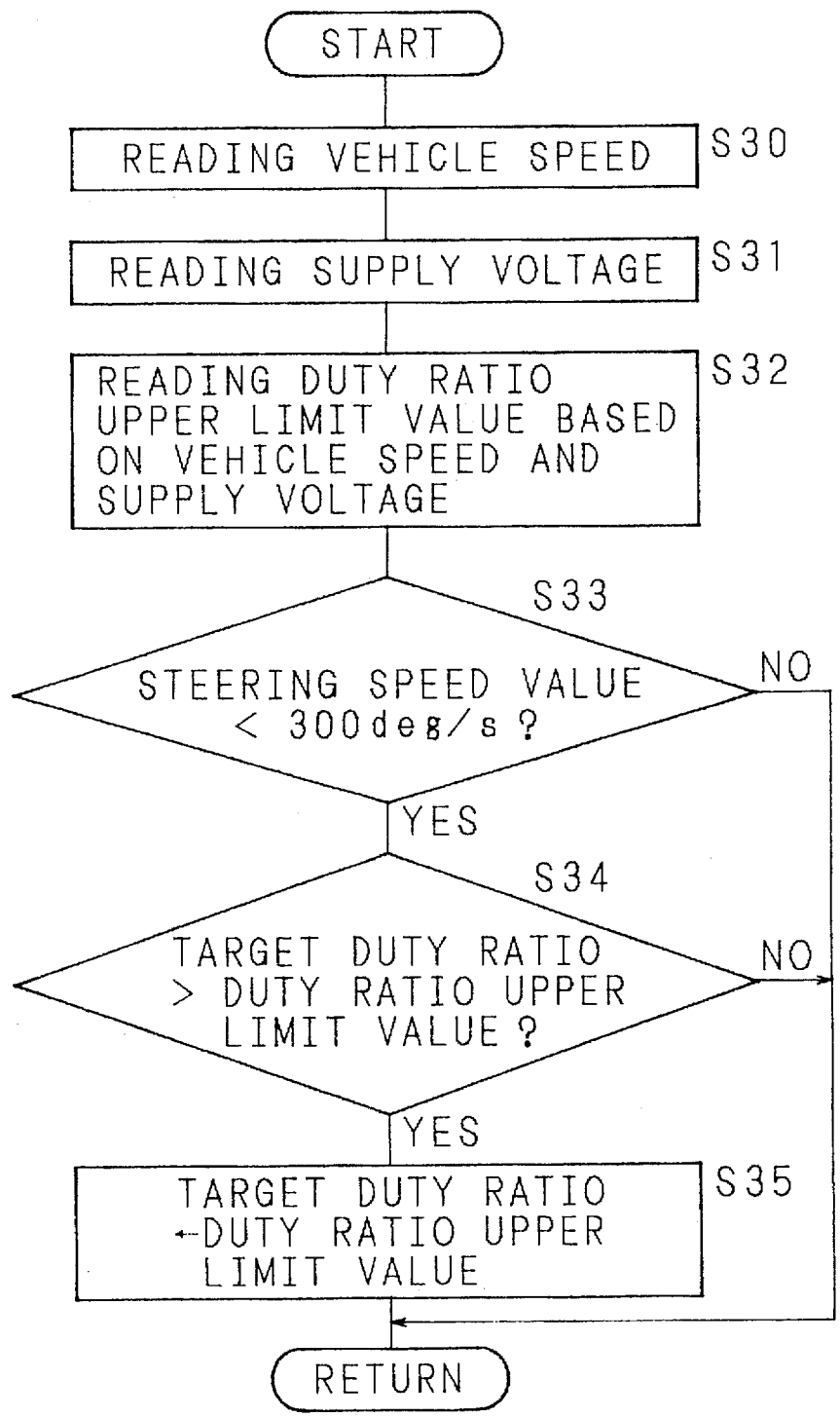
FIG. 7 is a flowchart for the operation for deciding a duty ratio for the PWM control in Embodiment 3.

The operation for deciding a duty ratio for the PWM control in Embodiment 3 will now be described referring to the flowchart shown in FIG. 7.

The microcomputer 1b reads a vehicle speed supplied from the vehicle speed sensor 7 and a supply voltage detected by the voltage sensor 9 (steps S30 and S31), and also reads a duty ratio upper limit value based on the supply voltage and the vehicle speed from the duty ratio upper limit table 20 (step S32).

The steering speed condition judgement means 25 is supplied with a steering speed value calculated by the steering speed calculation means 24, and compares the steering speed value with a predetermined steering speed value (for example, 300 deg./sec.) (step S33). When the steering speed value exceeds the predetermined steering speed value, the steering speed condition judgement means 25 does not transfer the duty ratio upper limit value read from the duty ratio upper limit table 20 to the duty ratio decision means 17. As a result, the duty ratio decision means 17 decides to use a target duty ratio determined on the basis of a control amount supplied from the PI calculation means 16, and a PWM wave signal of the target duty ratio is supplied to the motor driving circuit 4.

When the steering speed value calculated by the steering speed calculation means 24 is smaller than the predetermined steering speed value, the steering speed condition judgement means 25 transfers the duty ratio upper limit value read from the duty ratio upper limit table 25 to the duty ratio decision means 17.

The duty ratio decision means 17 compares the target duty ratio with the duty ratio upper limit value (step S34), and decides to use not the target duty ratio but the duty ratio upper limit value when the target duty ratio exceeds the duty ratio upper limit value (i.e., the target duty ratio is suppressed to be the duty ratio upper limit value at most) (step S35).

When the target duty ratio is smaller than the duty ratio upper limit value, the duty ratio decision means 17 decides to use the target duty ratio, and a PWM wave signal of the target duty ratio is supplied to the motor driving circuit 4. The remaining operation is conducted in the same manner as described with regard to the electric power steering apparatus of Embodiment 1, and hence the description is omitted.

In this manner, it is possible to distinguish the malfunction of the driving current detecting circuit 6 from the case where a detected value of the driving current detecting circuit 6 is decreased because of a smaller motor current caused by increase of a counter electromotive force resulting from increase of the number of rotations of the motor 5 due to abrupt steering (in this case the circuit is normally operated and the steering speed is comparatively large). In addition, it is possible to prevent an excessive steering assisting force caused by the malfunction of the driving current detecting circuit 6 because the maximum possible duty ratio for the PWM control becomes smaller as a vehicle speed is increased.

It is possible to provide the steering angle sensor 22 as a motor rotation sensor for detecting the number of rotations of the motor 5.

Embodiment 4

Figure 8:
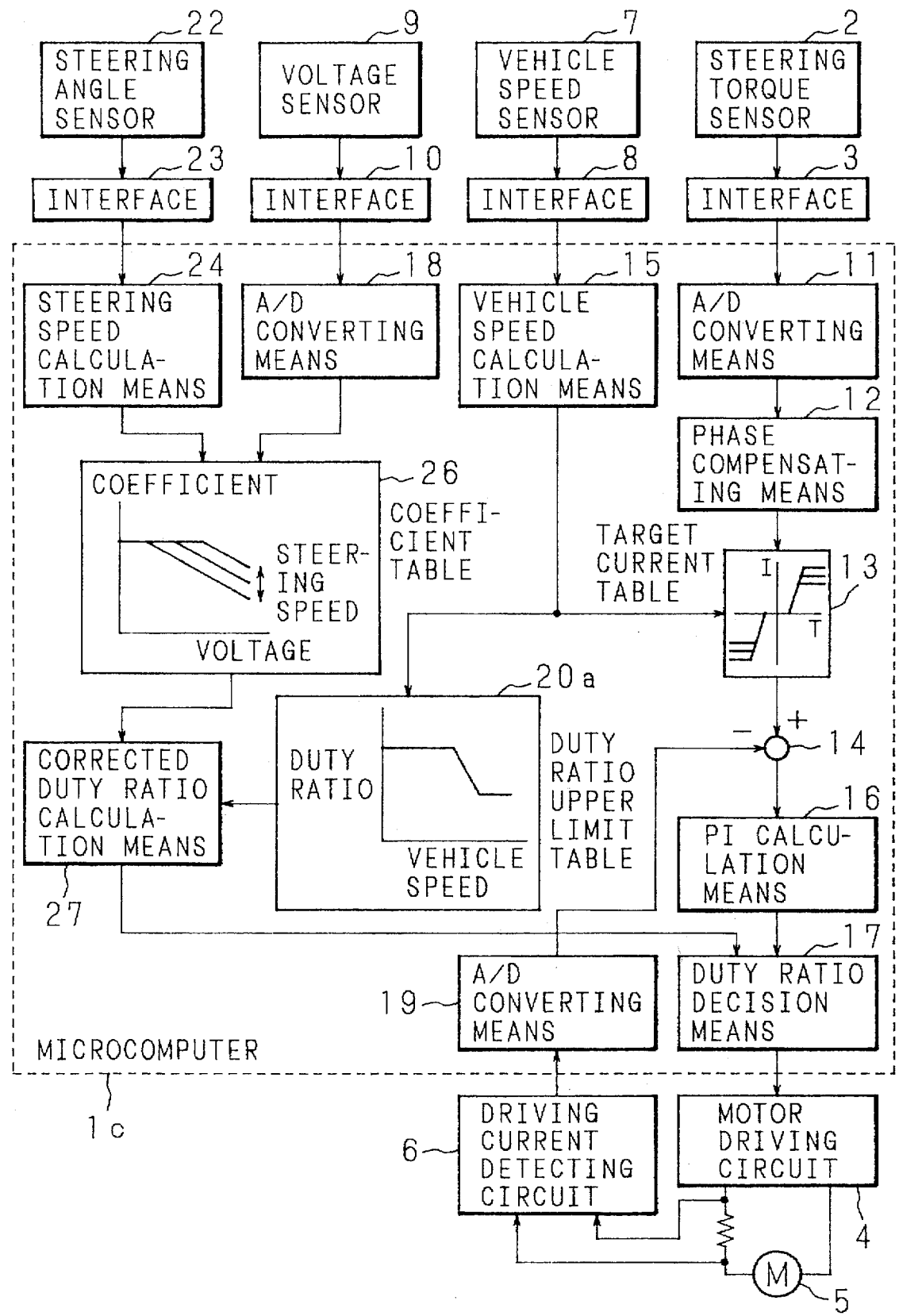
FIG. 8 is a block diagram showing a schematic configuration of an electric power steering apparatus of Embodiment 4 of the invention.
Figure 9:
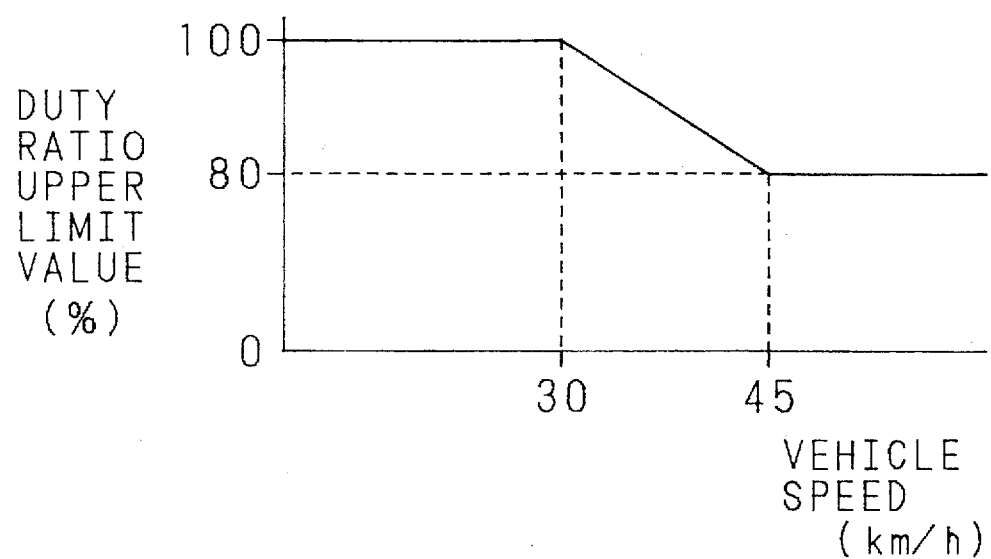
FIG. 9 is a graph showing a relationship between a vehicle speed and a duty ratio upper limit value for the PWM control in Embodiment 4.
Figure 10:
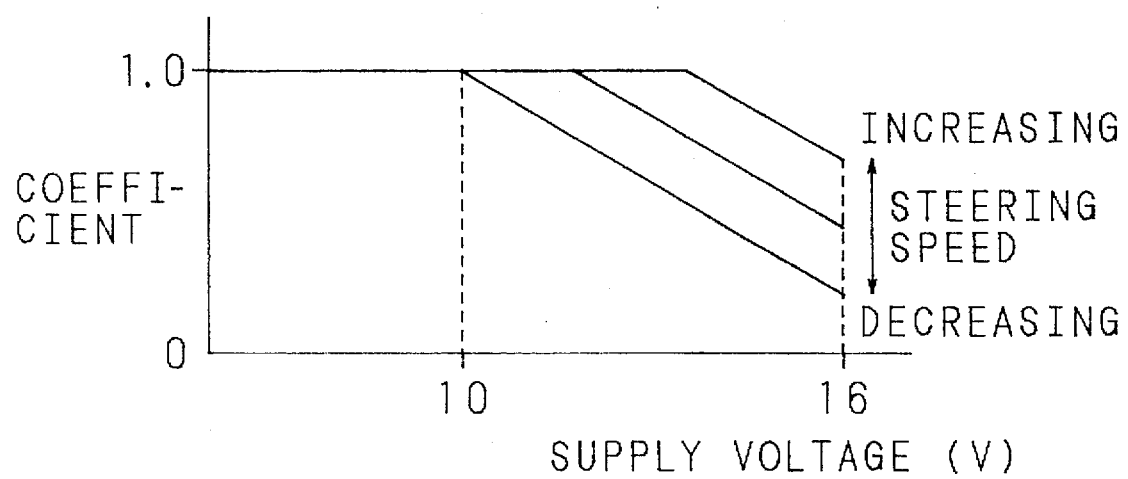
FIG. 10 is a graph showing a coefficient determined on the basis of a steering speed and a supply voltage in Embodiment 4.

FIG. 8 is a block diagram showing a schematic configuration of an electric power steering apparatus of Embodiment 4. In this electric power steering apparatus, a microcomputer 1c stores, in its memory, the relationship between a vehicle speed supplied from a vehicle speed sensor 7 and a duty ratio upper limit value for the PWM control as a duty ratio upper limit table 20a as is shown in FIG. 9, and reads a duty ratio upper limit value determined on the basis of a vehicle speed supplied from the vehicle speed sensor 7. Additionally, the electric power steering apparatus further comprises a steering angle sensor 22 for detecting a steering angle and an interface 23 for the steering angle sensor 22, and the microcomputer 1c further comprises steering speed calculation means 24 and a coefficient table 26. The steering speed calculation means 24 calculates a steering speed on the basis of a steering angle detected by the steering angle sensor 22. The coefficient table 26 shows the relationship of coefficients determined by a steering speed calculated by the steering speed calculation means 24 and a supply voltage detected by the voltage sensor 9. For example, the relationship as shown in FIG. 10 is stored in the memory as the coefficient table 26, from which a coefficient determined on the basis of a steering speed and a supply voltage is read.

A duty ratio upper limit value read from the duty ratio upper limit table 20a and a coefficient read from the coefficient table 26 are supplied to corrected duty ratio calculation means 27, in which a corrected duty ratio upper limit value is calculated and transferred to duty ratio decision means 17. The remaining configuration is same as that described with regard to the electric power steering apparatus of Embodiment 1, and hence the description is omitted.

Figure 11:
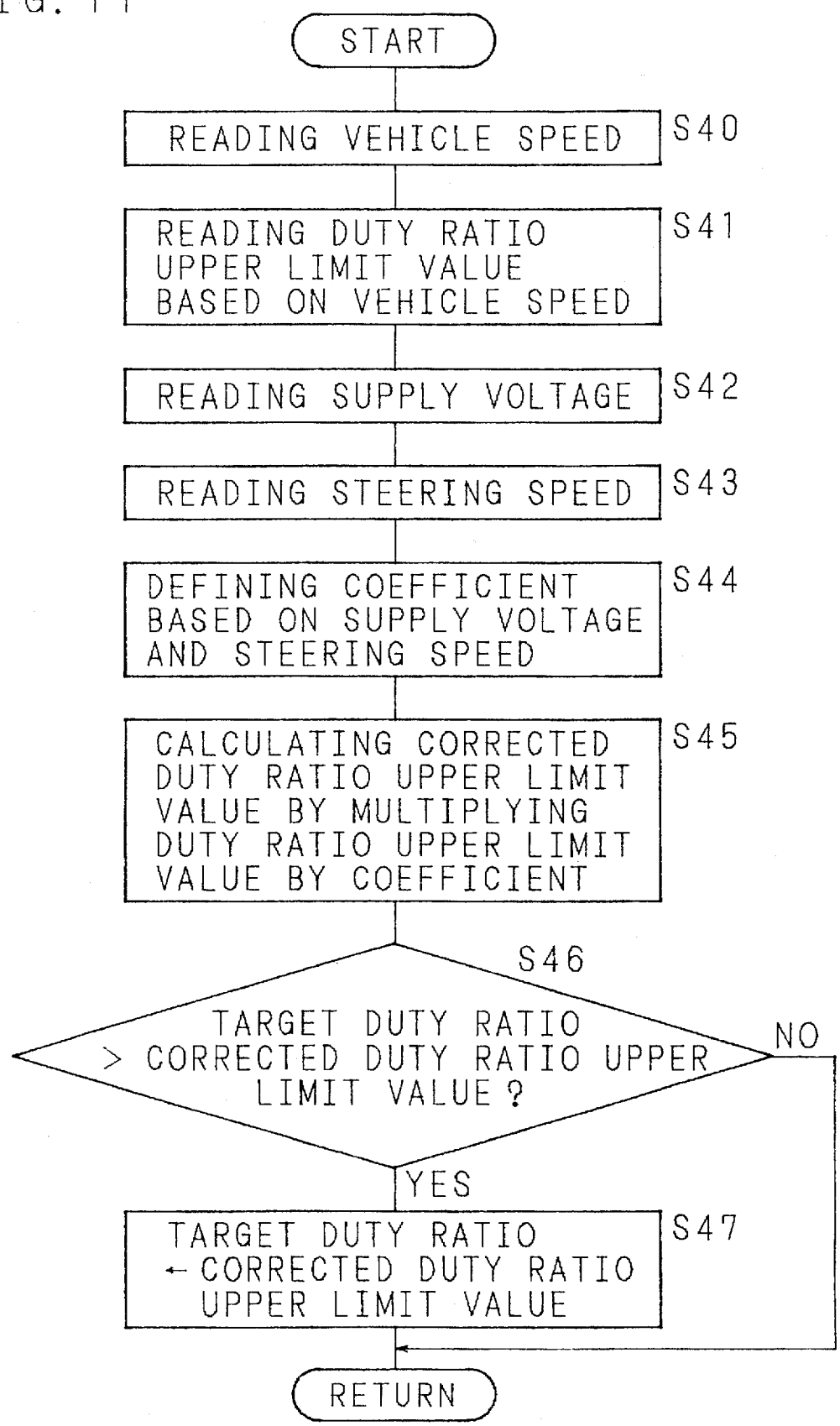
FIG. 11 is a flowchart for the operation for deciding a duty ratio for the PWM control in Embodiment 4.

The operation for deciding a duty ratio for the PWM control in Embodiment 4 will be described referring to the flowchart of FIG. 11.

The microcomputer 1c reads a vehicle speed supplied from the vehicle speed sensor 7 (step S40), reads a duty ratio upper limit value for the PWM control based on the vehicle speed from the duty ratio upper limit table 20a (step S41), and supplies the duty ratio upper limit value to the corrected duty ratio calculation means 27.

The microcomputer 1c further reads a supply voltage detected by the voltage sensor 9 and a steering speed calculated by the steering speed calculation means 24 (steps S42 and S43), reads a coefficient determined on the basis of the supply voltage and the steering speed from the coefficient table 26 (step S44), and supplies the coefficient to the corrected duty ratio calculation means 27.

The corrected duty ratio calculation means 27 calculates a corrected duty ratio upper limit value by multiplying the duty ratio upper limit value by the coefficient (step S45), and supplies the corrected duty ratio upper limit value to the duty ratio decision means 17.

The duty ratio decision means 17 compares the target duty ratio with the corrected duty ratio upper limit value (step S46), and decides to use not the target duty ratio but the corrected duty ratio upper limit value when the target duty ratio exceeds the corrected duty ratio upper limit value (i.e., the target duty ratio is suppressed to be the corrected duty ratio upper limit value at most) (step S47). A PWM wave signal of the obtained target duty ratio is supplied to the motor driving circuit 4.

When the target duty ratio is smaller than the corrected duty ratio upper limit value, the duty ratio decision means 17 decides to use the target duty ratio, and a PWM wave signal of the target duty ratio is supplied to the motor driving circuit 4. The remaining operation is conducted in the same manner as in the electric power steering apparatus of Embodiment 1, and hence the description is omitted.

In this manner, the maximum possible duty ratio for the PWM control can be reduced as a vehicle speed is increased and as a supply voltage for the motor 5 is increased. As a result, an excessive steering assisting force caused by the malfunction of the driving current detecting circuit 6 can be prevented.

It is possible to provide the steering angle sensor 22 as a motor rotation sensor for detecting the number of rotations of the motor 5.

In the present electric power steering apparatus, it is possible to deal with a target duty ratio which becomes smaller as a vehicle speed is increased, by reducing a duty ratio upper limit value as the vehicle speed is increased. In addition, it is possible to prevent an excessive steering assisting force caused by the malfunction of a driving current detecting circuit without being affected by the variation of a supply voltage, by decreasing the duty ratio upper limit value as the supply voltage is increased.

Furthermore, in the electric power steering apparatus of Embodiment 4, an excessive steering assisting force caused by the malfunction of the driving current detecting circuit can be prevented without being affected by a counter electromotive force since a coefficient determined by the coefficient decision means is decreased as a steering speed is decreased.

Moreover, in the electric power steering apparatus of Embodiment 2 or 3, it is possible to distinguish the malfunction of the driving current detecting circuit from the case where a detected value of the driving current detecting circuit is decreased because of a smaller motor current caused by increase of a counter electromotive force resulting from increase of the number of rotations of the steering power assisting motor due to abrupt steering. In addition, it is possible to deal with a target duty ratio which is decreased as a vehicle speed is increased, by decreasing a duty ratio upper limit value as the vehicle speed is increased. It is also possible to prevent an excessive steering assisting force caused by the malfunction of the driving current detecting circuit without being affected by the variation of a supply voltage because a duty ratio upper limit value is decreased as the supply voltage is increased.

As this invention may be embodied in several forms without departing from the spirit of essential characteristics thereof, the present embodiment is therefore illustrative and not restrictive, since the scope of the invention is determined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus for driving, under PWM control, a motor for assisting a steering power of a vehicle, comprising:

a vehicle speed sensor for detecting a speed of the vehicle;

an upper-limit decision means for determining a duty ratio upper limit value for the PWM control on the basis of the speed detected by the vehicle speed sensor and a voltage supplied to the motor;

a steering torque sensor for detecting a steering torque;

a target current value decision means for determining a target current value for the motor on the basis of the steering torque detected by the steering torque sensor; and a duty ratio decision means for determining a target duty ratio based on the target current value determined by the target current value decision means, wherein the duty ratio decision means outputs the target duty ratio as a duty ratio of a PWM wave signal used for driving the motor when the target duty ratio is smaller than the duty ratio upper limit value, and outputs the duty ratio upper limit value as the duty ratio of the PWM wave signal when the target duty ratio exceeds the duty ratio upper limit value.

2. The electric power steering apparatus according to claim 1, wherein the upper-limit decision means determines the duty ratio upper limit value to be smaller within a predetermined range as the vehicle speed and the supply voltage for the motor are increased.

3. An electric power steering apparatus for driving, under PWM control, a motor for assisting a steering power of a vehicle, comprising:

a vehicle speed sensor for detecting a speed of the vehicle;

an upper-limit decision means for determining a duty ratio upper limit value for the PWM control on the basis of the speed detected by the vehicle speed sensor and a voltage supplied to the motor;

a steering torque sensor for detecting a steering torque;

a target current value decision means for determining a target current value for the motor on the basis of the steering torque detected by the steering torque sensor;

a torque condition judgement means for comparing the steering torque with a predetermined torque value so as to output the duty ratio upper limit value supplied from the upper-limit decision means when the steering torque is smaller than the predetermined torque value; and a duty ratio decision means for determining a target duty ratio based on the target current value determined by the target current value decision means, wherein the duty ratio decision means outputs the target duty ratio as a duty ratio of a PWM wave signal used for driving the motor when the target duty ratio is smaller than the duty ratio upper limit value supplied by the torque condition judgement means, and outputs the duty ratio upper limit value as the duty ratio of the PWM wave signal when the target duty ratio exceeds the duty ratio upper limit value supplied by the torque condition judgement means.

4. The electric power steering apparatus according to claim 3, wherein the upper-limit decision means determines the duty ratio upper limit value to be smaller within a predetermined range as the vehicle speed and the supply voltage for the motor are increased.

5. An electric power steering apparatus for driving, under PWM control, a motor for assisting a steering power of a vehicle, comprising:

a vehicle speed sensor for detecting a speed of the vehicle;

an upper-limit decision means for determining a duty ratio upper limit value for the PWM control on the basis of the speed detected by the vehicle speed sensor and a voltage supplied to the motor;

a steering torque sensor for detecting a steering torque;

a target current value decision means for determining a target current value for the motor based on the steering torque detected by the steering torque sensor;

a steering speed detecting means for detecting a steering speed;

a steering speed condition judgement means for comparing the steering speed detected by the steering speed detecting means with a predetermined speed value so as to output the duty ratio upper limit value supplied from the upper-limit decision means when the steering speed is smaller than the predetermined speed value; and a duty ratio decision means for determining a target duty ratio based on the target current value determined by the target current value decision means, wherein the duty ratio decision means outputs the target duty ratio as a duty ratio of a PWM wave signal used for driving the motor when the target duty ratio is smaller than the duty ratio upper limit value supplied by the steering speed condition judgement means, and outputs the duty ratio upper limit value as the duty ratio of the PWM wave signal when the target duty ratio exceeds the duty ratio upper limit value supplied by the steering speed condition judgement means.

6. The electric power steering apparatus according to claim 5, wherein the upper-limit decision means determines the duty ratio upper limit value to be smaller within a predetermined range as the vehicle speed and the supply voltage for the motor are increased.

7. An electric power steering apparatus for driving, under PWM control, a motor for assisting a steering power of a vehicle, comprising:

a vehicle speed sensor for detecting a speed of the vehicle;

an upper-limit decision means for determining a duty ratio upper limit value for the PWM control on the basis of the vehicle speed detected by the vehicle speed sensor;

a steering speed detecting means for detecting a steering speed;

a coefficient decision means for determining a coefficient on the basis of the steering speed detected by the steering speed detecting means and a supply voltage for the motor;

a corrected upper-limit calculation means for calculating a corrected duty ratio upper limit value on the basis of the duty ratio upper limit value determined by the upper-limit decision means and the coefficient determined by the coefficient decision means;

a steering torque sensor for detecting a steering torque;

a target current value decision means for determining a target current value for the motor on the basis of the steering torque detected by the steering torque sensor; and a duty ratio decision means for determining a target duty ratio based on the target current value determined by the target current value decision means, wherein the duty ratio decision means outputs the target duty ratio as a duty ratio of a PWM wave signal used for driving the motor when the target duty ratio is smaller than the corrected duty ratio upper limit value, and outputs the corrected duty ratio upper limit value as the duty ratio of the PWM wave signal when the target duty ratio exceeds the corrected duty ratio upper limit value.

8. The electric power steering apparatus according to claim 7, wherein the upper-limit decision means determines the duty ratio upper limit value to be smaller within a predetermined range in accordance with an increase in the vehicle speed.

9. The electric power steering apparatus according to claim 7, wherein the coefficient decision means determines the coefficient to be smaller within a predetermined range in accordance with a decrease in the steering speed and in accordance with an increase in the supply voltage for the motor.

10. The electric power steering apparatus according to claim 7, wherein the corrected upper-limit calculation means multiplies the duty ratio upper limit value by the coefficient.

* * * * *